May 5, 1953 F. W. BUBB 2,637,495
COMPUTING DEVICE FOR VAPOR-LIQUID EQUILIBRIUM CALCULATIONS
Filed July 7, 1948 2 SHEETS—SHEET 1

INVENTOR.
Frank W. Bubb
BY Darby & Darby
ATTORNEYS

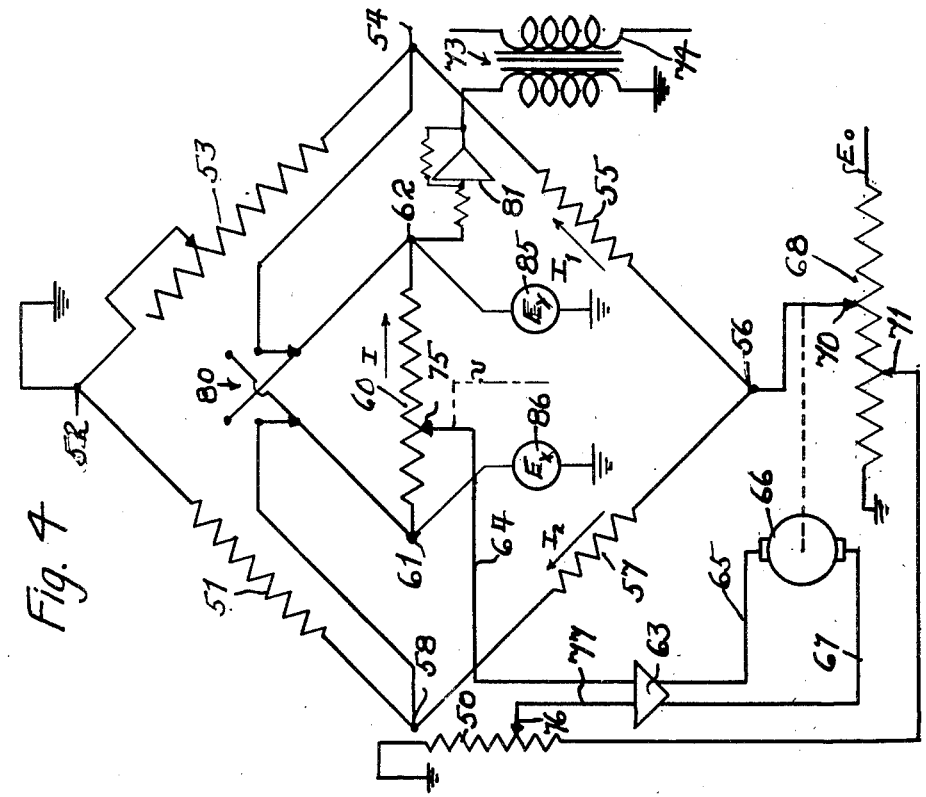
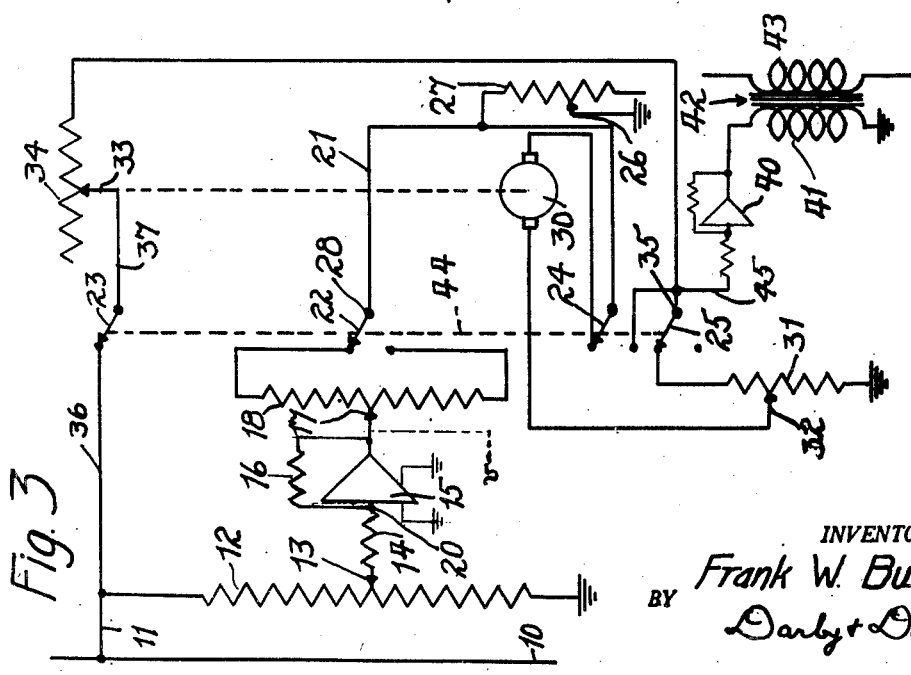

Patented May 5, 1953

2,637,495

UNITED STATES PATENT OFFICE 2,637,495

COMPUTING DEVICE FOR VAPOR-LIQUID EQUILIBRIUM CALCULATIONS

Frank William Bubb, Webster Groves, Mo., assignor to Phillips Petroleum Company, a corporation of Delaware Application July 7, 1948, Serial No. 37,333

20 Claims. (Cl. 235—61)

The present invention relates to computing devices and particularly to a computing device adapted to calculate vapor liquid ratios. More particularly still the machine is an electrical calculator designed for utilization in the oil industry or in the chemical industry where such vapor liquid equilibrium problems are common. In the oil industry problems concerning the processing of mixtures of hydrocarbons frequently arise. These processes may be distillation, fractionation, separation, storage and transportation, for example, and each involves the calculation of vapor liquid ratios as mentioned above.

The equations expressing the phase relations in problems as mentioned above are difficult of solution, generally yielding only to trial and error methods. Moreover, the calculations require men trained in the particular industry and capable of making such calculations and these trained men necessarily spend a large amount of time in the making of such calculations. This invention makes it possible to perform the calculations in much less time and, furthermore, the calculations can be performed by men without special training.

It is an object of the invention to provide an electrical calculator by means of which calculations of vapor phase relationship and ratios may be readily performed.

It is another object of the invention to provide an electrical calculator of the type described in which either alternating or direct current is utilized.

It is another object of the invention to provide such a calculator utilizing readily available electrical units.

It is still another object of the invention to provide such a calculator in which involved calculations can be performed rapidly even by unskilled personnel.

Other objects and features of the invention will appear when the following description is considered in connection with the annexed drawings, in which—

Figure 3 is a schematic diagram of the circuit of a computer unit utilizing a servo motor; and Figure 4 is a schematic diagram of a modified computer unit in which a servo motor is also utilized.

Figure 2:
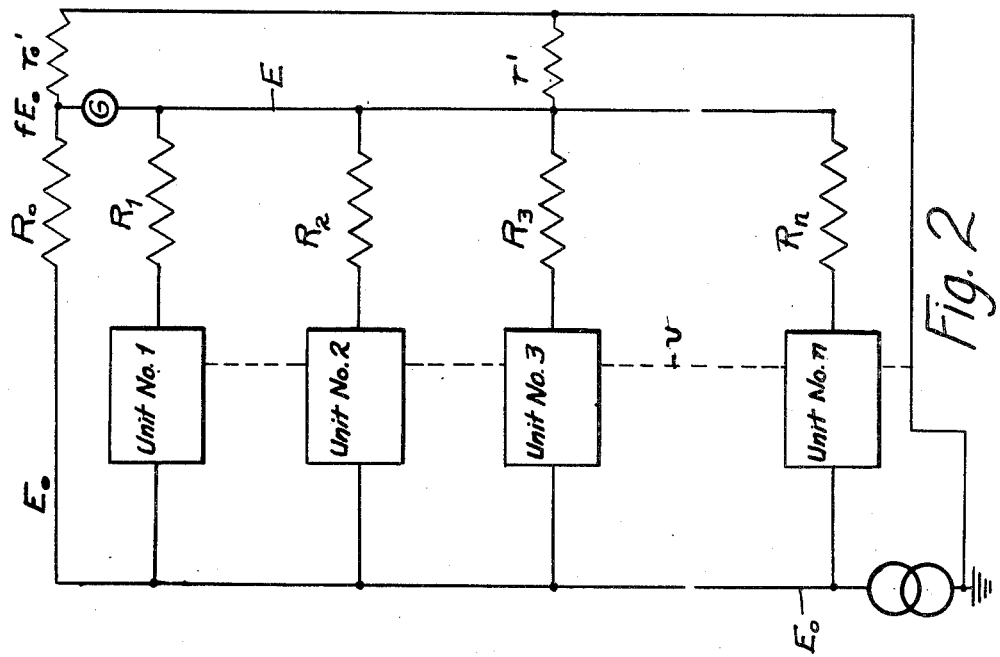
Figure 2 is a diagram similar to Figure 1 but showing a different mode of combining the computer units.

The specific problem which the present computer is designed to solve is the following: Given the total mols of each of $n$ components forming a vapor-liquid mixture in equilibrium at a given temperature and pressure and given the individual vapor-liquid equilibrium ratios; to calculate the over-all vapor fraction, the over-all liquid fraction, the total mols of vapor, the total mols of liquid, the individual vapor fractions, the individual liquid fractions, the mols of each component in vapor phase, and the mols of each component in liquid phase. In order to describe the operation of the computer in deriving the stated results it will be necessary that the notation utilized be understood. This notation follows:

$F$ = Total mols of a mixture of $n$ components $V$ = total mols of vapor in the mixture $L$ = total mols of liquid in the mixture $F_g$ = total mols of the $g$th component $V_g$ = mols of $g$th component in vapor phase $L_g$ = mols of $g$th component in liquid phase $x_g = \dfrac{L_g}{L}$ = mol-fraction of $g$th component in liquid phase $y_g = \dfrac{V_g}{V}$ = mol-fraction of $g$th component in vapor phase $z_g = \dfrac{F_g}{F}$ = mol-fraction of $g$th component in the mixture $v = \dfrac{V}{F}$ = the fraction of vapor in the mixture $K_g = \dfrac{y_g}{x_g}$ = equilibrium constant for the $g$th component at the given temperature and pressure.

In terms of this notation the problem may be stated as follows: Having given F, $F_g$, $z_g$, $K_g$ to calculate automatically the quantities $v$, V, L, $V_g$, $L_g$, $x_g$, $y_g$.

The following equations follow directly from the above definitions::

$$\Sigma F_g = F$$
$$\Sigma V_g = V$$
$$\Sigma L_g = L$$
$$\Sigma x_g = 1$$
$$\Sigma y_g = 1$$
$$\Sigma z_g = 1$$
$$V + L = F$$
$$y_g V + x_g L = z_g F$$

From the relationships set forth above the following equations can be deduced:

$$\Sigma x_i = \Sigma\left[\frac{z_i}{1+(K_i-1)v}\right]=1 \quad (1)$$

$$\Sigma y_i = \Sigma\left[\frac{z_i K_i}{1+(K_i-1)v}\right]=1 \quad (2)$$

$$V=vF \quad (3)$$

$$L=F-V \quad (4)$$

$$L_g=x_gL \quad (5)$$

$$V_g=y_gV \quad (6)$$

It will be apparent from the above equations, particularly from Equation 1, that the problem requires the solution of the following equation:

$$\frac{z_1}{1+(K_1-1)v}+\frac{z_2}{1+(K_2-1)v}+\cdots+\frac{z_n}{1+(K_n-1)v}=1 \quad (7)$$

Figure 1:
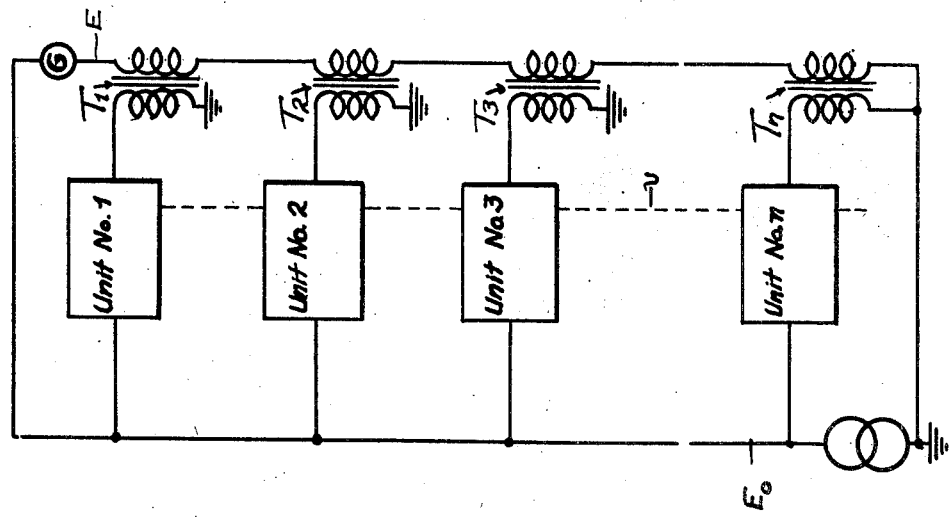
Figure 1 is a block diagram illustrating one mode of combining a number of computer units to form the complete computer.

The computer employs $n$ units, one for each component of the mixture. Since these units are interchangeable it will suffice to describe a single unit and then to explain how the units are connected together. It may be mentioned at this time, however, that Figures 1 and 2 illustrate the connection of a number of units with an input $E_0$ representing the line voltage and an output representing a typical fraction $$\frac{zE_0}{1+(K-1)v}$$

in Equation 7 above. At each computing unit there is a dial, as will be described, for setting the mol fraction $z$ and a dial for setting the equilibrium constant $K$, these dials being calibrated to read $z$ and $K$ directly. Also each unit is provided with a means for representing $v$ and varying it and in the assembly of the units the $v$ varying means are ganged together mechanically so that $v$ can be varied simultaneously on all units by operation of a single master dial. As will be seen by reference to Figure 1 the outputs of the various units represented as blocks are connected through transformers in series and the voltages thus added thereby giving a total voltage $E$. In other words $$\frac{z_1 E_0}{1+(K_1-1)v}+\frac{z_2 E_0}{1+(K_2-1)v}+\cdots+\frac{z_n E_0}{1+(K_n-1)v}=E \quad (8)$$

Connections are made so that the sum voltage $E$ is applied on one side of a galvanometer and the line voltage $E_0$ applied to the other side of the galvanometer. As will be apparent, by variation of the master dial representative of $v$, $E$ is varied until it equals $E_0$, this balance being very accurately indicated by a zero or null reading on the galvanometer. Also it will be clear that when $v$ is adjusted so that this condition exists, namely when $E=E_0$, this common factor can be cancelled from Equation 8 which leaves Equation 7. Thus the value of $v$ which causes the galvanometer to give a null reading is the required solution of Equation 7.

Alternatively, each output potential may be placed across a high resistance R as in Figure 2. All these resistances $R_1, R_2 \ldots R_n$ are equal and are so connected that the currents through them add and flow to ground through a low resistance $r'$. The potential $fE$ across $r'$ (where $f=r'/R$) is given by (8) and is connected to one terminal of the galvanometer. The line potential $E_0$ is connected to one end of a high resistance $R_0=R$, and the current through $R_0$ is sent through a low resistance $r_0'=r'$ to ground. The potential across $r_0'$ is $fE_0$ and thus is connected to the other terminal of the galvanometer G. By adjusting the $v$ dial, the voltage $E$ is varied until $E=E_0$, a condition indicated by a null reading on the galvanometer. As before, when $E=E_0$, this common factor (or $fE=fE_0$) may be canceled, leaving (8), with $v$ as the required solution to (8).

Having found the correct value of $v$ for the vapor-liquid mixture, the values of the total vapor V and the total liquid L may be calculated arithmetically in accordance with the relationships set forth in Equations 3 and 4 above.

As explained above, it is also desired to determine the individual liquid amounts of the individual vapor components. If now the line voltage is adjusted to the value L, that is if $E_0$ is changed to the value L without disturbing the computer in any way, then the individual liquid amounts may be read off as the voltages appearing at the outputs of the individual computer units. This is clearly true because from Equation 5

$$L_g=Lx_g$$

and since $$x_i=\frac{z_i}{1+(K_i-1)v}$$

then $$L_i=L\frac{z_i}{1+(K_i-1)v}$$

By an obvious arithmetical step depending upon Equation 4 above, the individual vapor amounts can be calculated arithmetically since $$V_g=F_g-L_g$$

In Figure 3 there is illustrated one form of computer unit for providing the voltage $$\frac{zE_0}{1+(K-1)v}$$

for each fraction term of Equation 7. The line conductor 10 on which a voltage $E_0$ is impressed is connected by means of conductor 11 to a potentiometer 12, the other side of the potentiometer 12 being grounded. Thus the potential $E_0$ is applied across the potentiometer.

Contact 13 which picks off the potential $zE_0$ from the potentiometer 12 is connected through a resistance 14 to a high gain amplifier 15 which has a feedback resistance 16 shunted across it. The output of the amplifier 15 is fed to the movable contact 17 on potentiometer 18.

The theory of the circuit comprising amplifier 15 and the resistances 14 and 16 is as follows: The current flowing through resistance 14 from contact 13 is—

$$\frac{zE_0-E_{20}}{r_{14}}=i_1$$

In this equation $E_{20}$ is the potential existing at the point 20 of Figure 3.

The current flowing from point 20 to contact 17 is—

$$\frac{E_{20}-E_{17}}{r_{16}}=i_2$$

Now since there is no current flow from the point 20 into the amplifier (since point 20 looks into the practically infinite impedance of the grid of the first tube of the amplifier) it follows that—

$$i_1=i_2$$

Furthermore, due to the use of the amplifier $$E_{17} = -\mu E_{20}$$

where $\mu$ is the amplification factor of the amplifier 15, the minus sign indicating that there are an odd number of stages in the amplifier.

From the above equations it follows that—

$$\frac{zE_0 + \frac{E_{17}}{\mu}}{r_{14}} = \frac{-\frac{E_{17}}{\mu} - E_{17}}{r_{16}}$$

Solving for $E_{17}$ we have—

$$E_{17} = -zE_0 \frac{r_{16}}{r_{14}} \left[ \frac{1}{1 + \frac{1}{\mu}\left(1 + \frac{r_{16}}{r_{14}}\right)} \right]$$

For high values of $\mu$ (of the order of from 5,000 to 10,000) the value of the bracket is nearly 1. Hence it is seen that the potential $ZE_0$ is transferred by the unity gain amplifier consisting of 14, 15, 16 from contact 13 to contact 17, there being a change in sign which is compensated for later.

Furthermore, since resistances 14 and 16 are very large compared to the resistance of potentiometer 12 no current, or a negligible one, is drawn from potentiometer 12 by contact 13. Nevertheless, the amplifier 15 can drive a large current through contact 17 since the current comes from ground through a source of power (B battery) in the amplifier itself.

As will be clear from Figure 3, the circuit is so set up that conductor 21 may be connected to either end of the potentiometer 18 and other circuit changes simultaneously made by means of the interconnection between switch blades 22, 23, 24 and 25. The purpose of the switches mentioned is to modify the circuit in accordance with whether the constant K is equal to or less than 1 ($K \leq 1$) or equal to or greater than 1 ($K \geq 1$). In the particular arrangement shown in Figure 3 the switch blades are in their upper position when the value of K is equal to or less than 1 and in their lower position when the value of K is equal to or greater than 1.

The contact 17 is set on the potentiometer 18 in such a manner as to divide the resistance of that potentiometer into two parts, one equal to $v$ and the other equal to $(1-v)$. Likewise the contact 26 is set on potentiometer 27 by means of a dial so that the resistance $$\frac{rK}{1-K}$$

exists between the contact 26 and the point 28. In other words, the potentiometers 18 and 27 are adjusted so that a resistance $$\frac{rK}{1-K}$$

is in series with the resistance $(1-v)r$ of the potentiometer 18 where $r$ is to the total resistance of the potentiometer 18 and also the total resistance of the potentiometer 27, these two potentiometers having equal resistances.

Then the current from the unity gain amplifier 15 passes through the series resistances mentioned to ground and maintains at the point 28 between potentiometers 18 and 27 a voltage $$\frac{-zE_0 K}{1+(K-1)v}$$

It will be noted that the value stated just above is the voltage required except for the factor K in the numerator and except for the minus sign.

The factor K is eliminated or cancelled out by utilizing a servomotor 30 in combination with the other circuit elements in the following manner. Assume that the total resistance of a potentiometer 31 is $s$, then the contact 32 may be set so that the resistance to ground of potentiometer 31 is $Ks$, this value being set by means of a dial. As will hereinafter appear, the servomotor 30 is so connected that the contact 33 on another potentiometer 34 is adjusted until the current through potentiometers 31 and 34 in series develops at the contact 32 a voltage equal to that at the point 28. Then the voltage at the point 35, that is across the entire potentiometer 31 will be $$\frac{1}{K}$$

times the voltage at point 32 and at point 28 and, consequently, the voltage at the point 45 has the required value since it is—

$$\frac{1}{K} \times \frac{-zE_0 K}{1+(K-1)v} \text{ or } \frac{-zE_0}{1+(K-1)v}$$

As stated above, the contact 33 controlled by the servo is automatically adjusted. This is done as follows: The voltage difference between point 28 and point or contact 32 is placed across the servomotor 30, the speed of the servomotor being proportional to the voltage difference or error. The servo is connected mechanically in such a way as to drive the contact 33 along potentiometer 34 in the direction required to correct the error. When the error has been corrected the servomotor 30 stops with the contact 33 at the proper adjustment point.

When a servomotor is utilized, it is not necessary to amplify the voltage error since sufficient power is supplied by the amplifier or from the line 10 through conductor 36, switch 23 and conductor 37 to the potentiometer 34.

A unity gain amplifier 40 takes as its input the potential present at the point 45, changes its sign and applies the potential $$\frac{zE_0}{1+(K-1)v}$$

to the primary 41 of the transformer 42, the secondary 43 of which is connected in series with like secondaries of transformers 42 of other units.

The addition of the output potentials, as above described, is indicated in Fig. 1 where it will be seen that the secondary voltages of the transformers are added and applied to one side of the galvanometer G to the other terminal of which the line voltage $E_0$ is applied.

As an alternative, the resistance method of addition illustrated in Figure 2 may be utilized. In this arrangement the resistances R1, R2, etc. are connected respectively to the outputs of units 1, 2, 3, etc. and the other ends of the resistances are connected together and shunted to ground through a small resistance $r'$ and their common potential $fE$ is placed on one terminal of a galvanometer G. When the contact 17 is adjusted so that $v$ has the desired value, then the potential E applied to one side of the galvanometer will be equal to $fE_0$ as shown in Figure 2, and as explained before, when $fE = fE_0$, these factors cancel from the Equation 8, and give the solution $v$.

In order to convert the circuit described above to one suitable for representing a fraction whose K value is greater than 1, it is only necessary to operate the member 44 which positions the switch blades 22, 23, 24 and 25 in their lower positions. The circuit which then remains operates as follows: The amplifier 15 supplies the voltage $zE_0$ to the potentiometers 18 and 27 in series as before. However, the used portion of the resistance of potentiometer 18 now has a value $vr$ and likewise the used portion of potentiometer 27 now has a value of $$\frac{r}{K-1}$$

The proportional division of the voltage at point 28 is then the required voltage, except for sign, and this voltage is now applied by means of conductor 21, switch blade 24 and conductor 45 to the unity gain driver 40 which reverses the sign and applies to the output secondary 43 the required voltage $$\frac{zE_0}{1+(K-1)v}$$

As will be clear from the above, the use of the circuit of Figure 3 requires the setting of the value $z$ on a dial (i. e. the movement of contact 13 on potentiometer 12), the setting of K on two dials (i. e. the setting of contact 26 on potentiometer 27 and the setting of contact 32 on potentiometer 31) and the throwing of a switch to discriminate between the cases when K is equal to or less than 1 and when K is equal to or greater than 1 (that is, the setting of member 44 in one of its two positions).

Although the circuit of Figure 3 is not drawn in such a way as to bring it out, it will be clear upon inspection that this figure illustrates a circuit which is essentially of the Wheatstone bridge type.

In Figure 4 there is shown another form of bridge circuit which constitutes a preferred circuit arrangement. In this instance the schematic diagram has been so drawn as to show the circuit as of the Wheatstone bridge type.

In the circuit of Figure 4 the bridge arms are the resistances 51, 55 and 57 and the potentiometer 53. Across one diagonal of the bridge is a potentiometer 60. This potentiometer is provided with a movable contact 75 which, in a manner to be described, adjusts the setting in accordance with the $v$ value and determines the operation of a servomotor to produce an output of the required value. The range of K values to which the circuit is adjusted at a particular moment is determined by the position of a reversing switch 80 which reverses the connections of potentiometer 60 across the bridge diagonal. With this switch arrangement, it is convenient to refer to the output voltages as $XE_0$ and $YE_0$. In a manner similar to that demonstrated above, it may then be shown that $$E_x = \frac{zE_0}{1+(K-1)v} \text{ and } E_y = \frac{zKE_0}{1+(K-1)v}$$

In the unit of Figure 4 the three similar potentiometers 50, 53 and 60 each has a resistance $r$. The potentiometer 50 is an accurate linear potentiometer whose contact position is determined by the constant $z$ and is left fixed during operation of the potentiometer, this potentiometer thus corresponding to the potentiometer 12 of Figure 3. Potentiometer 60 is also an accurate linear potentiometer and the position of its contact 75 is determined by the value of the variable $v$. The contacts 75 of the potentiometers 60 of the various computer units are ganged so that they may be adjusted simultaneously in accordance with the setting of a single dial. The potentiometer 53 is also accurately linear and its contact position is determined by the value of the equilibrium constant K and is left fixed during each operation of the computer. The contact 70 of the potentiometer 68 is adjusted automatically by means of a servomotor 66 and this potentiometer does not have to be accurately linear since the servomotor will cause the contact 70 to hunt for and find its correct position. The bridge arm resistances 51, 55 and 57 each has a value $r$.

Contact 76 is set manually along potentiometer 50, by means of a suitably calibrated dial, to place a potential $zE_0$ upon conductor 77 which feeds the amplifier 63. Contact 75 is set on the potentiometer 60 in accordance with the value $v$. The potential on contact 75 is transmitted over conductor 64 to the amplifier 63 and thus there is present upon the amplifier input the difference between the potentials at contacts 75 and 76. The output of the amplifier 63 is fed to the servomotor 66 which is effective to operate the contact 70 along the potentiometer 68. As the contact 70 moves the voltage supplied by the potentiometer 68 to contact 70, of course, varies and as a result the current through potentiometer 60 varies and thus the potential at contact 75 is adjusted until it is equal to that at contact 76. At this time the servomotor ceases to operate and the contact comes to rest.

The amplifier 63 draws only a negligible current from potentiometer 50 or 60 and thus the disturbance of linearity of the potentiometers mentioned is negligible.

As mentioned hereinabove, a switch 80 is provided in order to take care of the two ranges necessary depending upon where the value of K lies between 0 and 1 or between 1 and infinity. As illustrated, the circuit is arranged for the range from 0 to 1 and the alternative position of the switch blades shows the connections for the range from 1 to infinity.

When the switch blades are in the position shown, the following equations may be written by inspection:

$$E_{56} - E_{62} = I_1 r \quad (9)$$
$$E_{56} - E_{58} = I_2 r \quad (10)$$
$$E_{61} - E_{62} = I r \quad (11)$$
$$E_{62} = (I_1 + I) d \quad (12)$$

(where $d$ is the used portion of potentiometer 53)

$$E_{58} = E_{61} = (I_2 - I) r \quad (13)$$

(where $r$ is the value of resistances 51, 55 and 57)

$$E_{61} - vrI = zE_0 \quad (14)$$

(when the servo properly positions contact 70 on potentiometer 68)

$$E_{62} = KE_{61} \quad (15)$$

Now transposing Equation 14 we have—

$$E_{61} = vrI + zE_0 \quad (16)$$

Substituting the value of $E_{61}$ in terms of $E_{62}$ from Equation 15 into Equation 11 we have—

$$E_{61} - KE_{61} = Ir \quad (17)$$

When the value of $Ir$ from Equation 17 is now substituted in Equation 16, the following results—

$$E_{61} = vE_{61} - vKE_{61} + zE_0 \quad (18)$$

This equation may be rewritten as follows—

$$E_{61}(1 - v + vK) = zE_0 \quad (19)$$

or $$E_{61} = \frac{zE_0}{1+(K-1)v} \quad (20)$$

In a similar manner it can be demonstrated that—

$$E_{62} = \frac{zKE_0}{1+(K-1)v}$$

$$E_{56} = (3-K)E_{61}$$

$$d = \frac{Kr}{4-3K}$$

As will be clear, the output unity gain driver 81 is connected in circuit in accordance with the K range being utilized and, as in the other circuit embodiment, the driver feeds either the primaries of the accumulating transformers or the accumulating resistances.

In order that the instrument be practical in use it is necessary that the various contacts not run off the ends of their corresponding potentiometers. Since the $z$ and $v$ functions are always fractions in the range between 0 and 1, it will be obvious that no difficulties arise in connection with the potentiometers 50 and 60. Since the resistance of the potentiometer 53 by the equation given is equal to $$\frac{Kr}{4-3K}$$

and since K is limited to the range from 0 to 1 it follows that the $d$ value lies in the range from 0 to $r$. Consequently, if the total resistance of potentiometer 53 be made equal to that of the potentiometer 60 no over-shooting of the ends will occur. Furthermore, since $E_{56}=(3-K)E_{61}$ and since the least value of K is 0 and the greatest value of $E_{61}$ is $E_0$ then clearly the maximum potential which is required from the autotransformer 73 is $3E_0$. This condition can always be met by supplying a voltage $3E_0$ to the potentiometer 68.

The above discussion has shown that the computer unit of Figure 4 will produce the desired result when K is in the range from 1 to 0 and with the blades of switch 80 in the position illustrated in Figure 4. A similar series of equations may be derived to show the conditions existing when the switch blades are thrown to their alternate positions and because of the substantially exact correspondence of these equations, it is believed unnecessary to set them forth at length. They show that the requirements for the values of the various potentiometers are the same as when K lies in the range from 0 to 1 and that, consequently, the utilization of the switch 80 is proper.

Since the output voltage is applied through the very large impedance of the driver tube 81 this driver prevents disturbance of the linearity of the computer circuits and at the same time the output of the driver yields sufficient current to properly operate the adding transformers if the arrangement of Figure 1 is utilized or the adding resistances if the arrangement of Figure 2 is utilized.

In the foregoing discussion it has been assumed that the three resistances 51, 55 and 57 have equal values. This is preferable since it renders the analysis of the circuit conditions simpler. However, these resistances may be unequal, the only complication being that the equations heretofore set forth are a bit more complicated.

In performing the addition, the blades of switches 80 of Figure 4, of all computer units are placed in positions corresponding to the proper K values. In one computation the $E_{61}$ voltages may be added and in another the $E_{62}$, in the first case the inputs to drivers 81 being connected to points 61, in the other these inputs 81 being connected to points 62, the addition being performed in the series connected secondaries of the transformers as shown in Figure 1 or in the manner of Figure 2. The sum voltage is placed on one terminal of a galvanometer indicated at G in Figure 1 and the other terminal of this galvanometer is connected to the same voltage $E_0$ which is applied to the potentiometers 50 of the various computer units. By operating the dial which controls the simultaneous positioning of all of the contacts 75, each individual voltage $E_{61}$ or $E_{62}$ as well as their sum $\Sigma E_{61}$ and $\Sigma E_{62}$ is varied until it equals $E_0$, the balance condition being accurately indicated by a null or zero reading on the galvanometer G.

In a manner similar to that heretofore described, the resistance addition illustrated in Figure 2 may be substituted for the transformer addition method of Figure 1 without in any way altering the operation of the device.

As has been demonstrated when $v$ is so set that $E=E_0$, this common factor cancels from the following equations:

$$\frac{z_1E_0}{1+(K_1-1)v}+\frac{z_2E_0}{1+(K_2-1)v}+\cdots+\frac{z_nE_0}{1+(K_n-1)v}=E$$

$$\frac{z_1K_1E_0}{1+(K_1-1)v}+\frac{z_2K_2E_0}{1+(K_2-1)v}+\cdots+\frac{z_nK_nE_0}{1+(K_n-1)v}=E$$

It follows from this that the value of $v$ which gives a null reading on the galvanometer G is the required solution of the equations immediately above. Furthermore, the fact that the solutions of these two equations should be equal gives a check on the operation of the computer.

Having the correct value of $v$ as just above described the value of the total vapor $V=vF$ can then be calculated as can the total liquid L equal to $F-V$. Following this by setting $E_0$ at a known value, say 100, it is possible to read off at the points 61 and 62 by means of vacuum tube voltmeters 85 and 86 of the particular unit considered, the significant figures for the liquid and vapor fractions $x_g$, $y_g$.

Further, if $E_0$ is made equal to L, then it is possible to read off the values $L_g=x_gL$ at the corresponding points 61 of the desired computer units. Moreover if $E_0$ is made equal to V then the values $V_g$ equal to $y_gV$ can be read off at the various points 62. Hence as was shown at the beginning of this discussion, the computer evaluates $v$, provides a check on this value of $v$ and provides all of the $x_g$, the $y_g$, the $L_g$ and the $V_g$ values; in short computes all the quantities in the problem.

While a number of preferred embodiments of my invention have been described above, it will be obvious that the circuit arrangements may be modified within the scope of the invention and, consequently, I wish to be limited not by the foregoing description which was given solely for purposes of illustration but on the contrary only by the claims granted.

What is claimed is:

1. In a computer for determining the total fraction of vapor in a liquid-vapor mixture at equilibrium, in combination, a plurality of circuits corresponding respectively to the several components of said mixture, each circuit having a variable impedance element representative of a function of the equilibrium constant K of a particular component of the mixture, a variable impedance element representative of a function of the total fraction $z$ of the particular component of the mixture, and a variable impedance element representative of the fraction of vapor $v$ in the mixture, means for simultaneously adjusting said last mentioned $v$-representative impedances of all said circuits, means for supplying a standard potential $E_0$ to all of said circuits, said standard potential being modified in each of said circuits in accordance with the setting of the variable impedance elements to produce an output potential substantially equal to $$\frac{zE_0}{1+(K-1)v}$$

means for adding the output potentials of said plurality of circuits, and means for indicating the equality of the said sum to the standard voltage thereby indicating that the setting of the impedances representative of the total fraction of vapor $v$ is correct.

2. In a computer for determining the total fraction of vapor in a liquid vapor mixture at equilibrium, in combination, a plurality of circuits corresponding respectively to the several components of said mixture, each circuit having a variable impedance element representative of a function of the equilibrium constant $K$ of a particular component of the mixture, a variable impedance element representative of a function of the total fraction $z$ of the particular component of the mixture, and a variable impedance element representative of the total fraction of vapor $v$ in the mixture, means for simultaneously adjusting said last mentioned $v$-representative impedances of all said circuits, means for supplying a standard potential $E_0$ to all of said circuits, said standard potential being modified in each of said circuits in accordance with the setting of the variable impedances to produce an output potential substantially equal to $$\frac{zE_0}{1+(K-1)v}$$

means for adding the outputs of said plurality of circuits, means for indicating the equality of the said sum to the standard voltage thereby indicating that the setting of the impedances representative of the total fraction of vapor is correct, and a scale associated with said means for adjusting the impedances representative of the total fraction of vapor whereby a reading of this value may be had upon attaining said equality.

3. In a computer for determining the total fraction of vapor in a liquid-vapor mixture at equilibrium and the total mols of the various components in liquid phase, in combination, a plurality of circuits corresponding respectively to the several components of said mixture and each having a variable impedance element representative of a function of the equilibrium constant $K$ of a particular component of the mixture, a variable impedance element representative of a function of the total fraction $z$ of the particular component of the mixture and a variable impedance element representative of the total fraction of vapor $v$ in the mixture, means for simultaneously adjusting said last mentioned impedance of all said circuits, means for supplying a standard potential $E_0$ to all of said circuits, said standard potential being modified in each of said circuits in accordance with the setting of the variable impedance representative of the total fraction $z$ of the particular component of the mixture, means for adjusting the output of each circuit in accordance with the impedance values set to produce an output substantially equal to $$\frac{zE_0}{1+(K-1)v}$$

means for adding the outputs of said plurality of circuits, means for indicating the equality of the said sum to the standard voltage thereby indicating that the setting of the impedances representative of the total fraction of vapor is correct, a scale associated with said means for adjusting the impedances representative of the total fraction of vapor, said scale thereby giving a reading of this value, means for adjusting the standard voltage to a value representative of the total mols of liquid in the mixture, and indicating means for the potential at the output of each individual circuit, said indicating means being calibrated to read the total mols of the liquid phase of the mixture component represented by that individual circuit.

4. In a computer for determining the total fraction of vapor in a liquid-vapor mixture at equilibrium, in combination, a plurality of circuits of the Wheatstone bridge type each having a bridge arm representative of a function of the equilibrium constant $K$ of a particular component of the mixture, and a bridge diagonal representative of the total fraction of vapor $v$ in the mixture, means for simultaneously adjusting said last mentioned $v$-representative elements of all said circuits, a source of constant standard potential $E_0$, means for modifying said standard potential in accordance with the function of the total fraction $z$ of the particular component in the mixture and applying said modified potential across the particular bridge, means for adjusting the output of each circuit in accordance with the adjustment of the variable element of the bridge, means for adding the outputs of said plurality of circuits, means for indicating the equality of said sum to the standard voltage, and means for indicating the setting of said simultaneously adjustable bridge elements representative of the fraction of vapor in the mixture.

5. In a computer for determining the fraction of vapor in a liquid-vapor mixture at equilibrium and the total mols of the various components in liquid phase, in combination, a plurality of circuits of the Wheatstone bridge type each having a bridge arm representative of a function of the equilibrium constant of a particular component of the mixture, and a bridge element representative of the total fraction of vapor in the mixture, means for simultaneously adjusting said last mentioned elements of all said circuits, a source of constant standard potential, means for modifying said standard potential in accordance with a function of the total fraction of the particular component of the mixture, and applying said modified potential across the particular bridge, a servomotor for adjusting the amount of modification of said standard voltage to thereby vary the output of each circuit in accordance with the adjustment of the variable element of the bridge, means for adding the outputs of said plurality of bridge circuits, means for indicating the equality of said sum to the standard voltage, means for indicating the setting of said simultaneously adjustable bridge elements representative of the fraction of vapor in the mixture, means for adjusting the standard voltage to a value representative of the total mols of liquid in the mixture, and indicating means for the potential at the output of each individual circuit, said indicating means being calibrated to read the total mols of liquid phase of the component of the mixture represented by that individual circuit.

6. In a computing circuit for determining the value of $v$ in an equation of the form $$\frac{z_1}{1+(K_1-1)v}+\frac{z_2}{1+(K_2-1)v}+\cdots+\frac{z_n}{1+(K_n-1)v}=1$$

in combination, a plurality of Wheatstone bridge electrical resistance networks, one for each term of the equation, each said network comprising a variable resistance representative of the value of $z$ in the corresponding equation term, a variable resistance in one arm of said Wheatstone bridge network and representative of a function of the value of K in the corresponding equation term, and a variable resistance across a diagonal of said bridge network representative of the value of $v$, means for applying a predetermined voltage to all said networks, means for simultaneously adjusting the resistances representative of $v$ in all said networks, and means for adding the outputs of said networks and comparing the sum thus derived with the predetermined voltage, said means for adjusting said $v$ values being varied until said indicating means indicates equality between the sum and the standard voltage thus showing the $v$ value so set to be the desired solution.

7. A computing circuit in accordance with claim 6 characterized in that a voltmeter is connected from each end of the resistance representing $v$ in each circuit network to ground, and means are provided for adjusting the standard voltage to a value representative of the total quantity of the particular component of the mixture, whereby said meters indicate the fraction of the particular component in liquid phase and the fraction of the component in vapor phase.

8. A computing circuit in accordance with claim 6, characterized in that a voltmeter is connected from one end of the resistance representing $v$ in each circuit network to ground and means are provided for adjusting the standard voltage to a value representative of the total mols of liquid in the mixture, whereby said meter indicates the total mols of the particular component which is in liquid phase.

9. A computing circuit in accordance with claim 6, characterized in that a voltmeter is connected from one end of the resistance representing $v$ in each circuit network to ground and means are provided for adjusting the standard voltage to a value representative of the total mols of vapor in the mixture, whereby said meter indicates the total mols of the particular component which is in vapor phase.

10. In a computer for determining the fraction of vapor in a liquid-vapor mixture at equilibrium and the total mols of the various components in liquid phase, in combination, a supply of electrical current at a predetermined standard voltage, and a plurality of circuit networks fed from said supply and having the outputs therefrom added and their sum compared with said standard voltage, each said circuit network comprising a potentiometer connected across said source of standard voltage, a contact adjustable along said potentiometer whereby the potential supplied to the remainder of the network is a function of the standard voltage and of the total fraction of the component of the mixture represented by the particular network, an amplifier having unity gain connected to said contact, whereby the output of said amplifier is at the same potential value as that derived from said potentiometer but without current drain from said potentiometer, a second potentiometer representative of the fraction of liquid in the mixture, said second potentiometer having a variable contact thereon connected to the output of said amplifier, said variable contacts of all said second potentiometers of said plurality of networks being simultaneously adjustable, a third potentiometer connected between one end of said second potentiometer and ground, said connection being through a variable contact on said third potentiometer, said third potentiometer being representative of a function of the equilibrium constant of the particular component of the mixture at the given temperature and pressure, a variable resistance having an adjustable contact therein, said contact being connected to one side of said source of standard voltage, a second variable resistance in series with said first variable resistance and connected to the other side of the source of standard voltage, a servomotor connected on one side to the juncture of said second and third potentiometers and on the other side to the variable contact of said second variable resistance, means driven by said potentiometer for varying the position of the adjustable contact on said first mentioned variable resistance, and a unity gain amplifier connected across the juncture of said two variable resistances and ground, said amplifier having its output added to the outputs of all other networks, whereby the setting of the contact on said second mentioned potentiometer causes a voltage differential to exist across the servomotors of all said networks and the resultant adjustment of each network individually to produce an output in accordance with the settings of the first and third potentiometers and of the first and second variable resistances, the means for adjusting the ganged contacts of said second potentiometers being provided with a calibrated scale whereby the setting of said ganged contacts when the sum of all the output voltages is equal to the standard voltage is the fraction of vapor in the mixture.

11. In a computer for determining the fraction of vapor in a liquid vapor mixture at equilibrium, in combination, a plurality of circuits each comprising a Wheatstone bridge and each representing a component of the mixture, three of the arms of said bridge being resistances of constant value, the fourth arm being a potentiometer adjustable to represent a function of the equilibrium constant of the particular mixture component at a predetermined temperature and pressure, a potentiometer connected across one diagonal of said bridge, said potentiometer having a variable top whose position is representative of the total fraction of vapor in the mixture, a source of potential for all of said bridge circuits, a potentiometer having a variable contact whose position is representative of the total fraction of each component of the mixture, a servomotor connected between the variable contact of said last mentioned potentiometer and the variable contact on said bridge diagonal potentiometer, a potentiometer connected with the source of power supply and across the other diagonal of the bridge, a variable contact on said last mentioned potentiometer, said variable contact being automatically positioned by said servomotor to thereby yield a particular output, calibrated manually operable means for setting the variable contacts of all of said bridge diagonal potentiometers simultaneously, means for adding the outputs of said bridge networks, and means for comparing the sum of said outputs to the voltage of said potential source, whereby the calibrated reading of said manual contact setting means indicates the desired value of the vapor fraction of the mixture.

12. A device as claimed in claim 11, characterized in that a voltmeter is connected from each end of the bridge diagonal potentiometer to ground, and means are provided for adjusting the standard voltage to a value representative of the total quantity of the particular component of the mixture, whereby said voltmeters indicate the fraction of the particular component in liquid phase and the fraction of the component in vapor phase.

13. A device according to claim 11, characterized in that a voltmeter is connected from one end of the bridge diagonal potentiometer of each Wheatstone bridge to ground, and means are provided for adjusting the standard voltage to a value representative of the total mols of liquid in the mixture, whereby said meter indicates the total mols of the particular component which is in liquid phase.

14. In a computer for determining the fraction of vapor in a liquid vapor mixture at equilibrium, in combination, a plurality of circuits each comprising a Wheatstone bridge and each representing a component of the mixture, three of the arms of said bridge being resistances of constant value, the fourth arm being a potentiometer adjustable to represent a function of the equilibrium constant of the particular mixture component at a predetermined temperature and pressure, a potentiometer connected across one diagonal of said bridge, said potentiometer being representative of the total fraction of vapor in the mixture, a source of potential for all of said bridge circuits, a potentiometer representative of and settable in accordance with the total fraction of each component associated with the bridge network for the corresponding component, a servomotor connected between the variable contact of said last mentioned potentiometer and the variable contact on said bridge diagonal potentiometer, a potentiometer connected with the source of power supply and across the other diagonal of the bridge, a variable contact on said last mentioned potentiometer, said variable contact being automatically positioned by said servomotor to thereby yield a particular output, calibrated manually operable means for setting the variable contacts of all of said bridge diagonal potentiometers simultaneously, means for adding the outputs of said bridge networks, means for comparing the sum of said outputs to the standard voltage, whereby the calibrated reading of said manual contact setting means indicates the desired value of the vapor fraction of the mixture upon equality of said sum and standard voltages, a reversing switch connected to the ends of the bridge diagonal potentiometer to thereby reverse said potentiometer electrically across the diagonal of the bridge in accordance with the range of values, said reversing switch when in one of its two positions conditioning the circuit for operation when the value of the equilibrium constant is in the range from zero to 1 and in its alternate position conditioning the circuit for operation when the range of said equilibrium constant is from 1 to infinity.

15. A device as claimed in claim 14, characterized in that a voltmeter is connected from each end of the bridge diagonal potentiometer to ground, and means are provided for adjusting the standard voltage to a value representative of the total quantity of the particular component of the mixture, whereby said voltmeters indicate the fraction of the particular component in liquid phase and the fraction of the component in vapor phase.

16. A device as claimed in claim 14, characterized in that a voltmeter is connected from one end of the bridge diagonal potentiometer of each Wheatstone bridge to ground, and means are provided for adjusting the standard voltage to a value representative of the total mols of liquid in the mixture, whereby said meter indicates the total mols of the particular component which is in liquid phase.

17. A computer for determining the total fraction of vapor $v$ at equilibrium in a liquid-vapor mixture having a plurality of components each having a known equilibrium constant $K_g$ and a known total fraction $z_g$ of each particular component, comprising a source of standard potential $E_0$; a plurality of circuits corresponding respectively to said components, each circuit comprising means for modifying said standard potential $E_0$ in accordance with said total component fraction $z_g$ to produce a modified potential of value $z_g E_0$, and means, including a variable impedance element representative of and settable in accordance with a function of the equilibrium constant $K_g$ of the particular component of the mixture and also including a variable impedance element representative of and settable in accordance with the total fraction of vapor $v$ in said mixture, for producing an output potential proportional to $$\frac{z_g E_0}{1+(K_g-1)v}$$

means ganging said $v$-representative elements of all said circuits for simultaneous adjustment; means for additively combining said output potentials to produce a sum potential; and means for indicating the equality of said sum potential to said standard potential, whereby, when each of said K-representative and $z$-representative impedances is adjusted to the known values of $K_g$ and $z_g$ for all said components and when said ganged $v$-representative elements are adjusted to a value producing equality of said sum and standard potentials, the setting of said $v$-representative elements indicates the true value of $v$.

18. A computer for solving an equation of the form $$\sum_{g=1}^{q=n}\frac{z_g}{1+(K_g-1)v}=1$$

for $v$ in terms of $z_g$ and $K_g$, comprising a source of standard potential $E_0$; $n$ circuits each comprising three calibrated variable impedance elements respectively representative of and settable in accordance with $z_g$, $K_g$ and $v$, and means in circuit with said elements for producing an output potential proportional to $$\frac{z_g E_0}{1+(K_g-1)v}$$

means ganging said $v$-representative elements of all said circuits for simultaneous adjustment; means for additively combining said output potentials to produce a sum potential; and means for indicating the equality of said sum potential to said standard potential, whereby, upon adjusting said $v$-representative elements to a setting producing said equality, their setting indicates the solution $v$ of said equation.

19. A computing apparatus for producing an output signal corresponding to an input signal divided by a function of the type $1+(K-1)v$, comprising a Wheatstone bridge arrangement having three equal fixed arms and a fourth arm formed by a variable resistance linearly calibrated in terms of $K$, a potentiometer connected across one diagonal of said bridge and having a variable tap, said potentiometer being of linear resistance and calibrated in terms of $v$ between 0 and 1, a source of variable voltage connected across the other diagonal of said bridge, and means for adjusting the voltage of said source until the potential of said variable tap is equal to said input signal whereby the potential of one end of said potentiometer represents said desired output signal.

20. A computing apparatus for producing an output signal corresponding to an input signal divided by a function of the type $1+(K-1)v$, comprising a potentiometer of total resistance $r$ calibrated in accordance with $v$, and having a variable tap, means applying a voltage to said tap equal to said input signal, a variable resistor coupled in series with one terminal of said potentiometer and adjustable to a value $$\frac{rK}{1-K}$$

said resistor and the portions of said potentiometer between its said one terminal and variable tap having voltage impressed thereacross, a second potentiometer having a variable tap and calibrated in terms of $K$, a source of variable voltage connected across said second potentiometer, and means for adjusting said variable voltage to produce a potential at said second variable resistor, whereby said variable voltage is then proportional to the said input signal divided by $1+(K-1)v$.

FRANK WILLIAM BUBB.

References Cited in the file of this patent

UNITED STATES PATENTS

| Number | Name | Date |
|---|---|---|
| 2,134,901 | Wey | Nov. 1, 1938 |
| 2,246,575 | Coleman | June 24, 1941 |
| 2,410,651 | Glass | Nov. 5, 1946 |
| 2,417,098 | Wilcox | Mar. 11, 1947 |
| 2,503,387 | Hartwig | Apr. 11, 1950 |
| 2,557,070 | Berry | June 19, 1951 |

OTHER REFERENCES

Electronic Computers, Shannon, Electronics, August 1946, pages 110 to 113.